(12) United States Patent
Jones

(10) Patent No.: US 12,313,280 B2
(45) Date of Patent: *May 27, 2025

(54) LAYERED CONTROL PANEL DESIGN TO PROVIDE SEPARATION OF HIGH/LOW VOLTAGE

(71) Applicant: TRANE INTERNATIONAL INC., Davidson, NC (US)

(72) Inventor: Steven Jones, Franklin, TN (US)

(73) Assignee: TRANE INTERNATIONAL INC., Davidson, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/479,402

(22) Filed: Oct. 2, 2023

(65) Prior Publication Data

US 2024/0255171 A1 Aug. 1, 2024

Related U.S. Application Data

(63) Continuation of application No. 17/136,904, filed on Dec. 29, 2020, now Pat. No. 11,774,132.

(51) Int. Cl.
*F24F 11/89* (2018.01)
*F24F 11/88* (2018.01)
*F24F 140/50* (2018.01)

(52) U.S. Cl.
CPC .............. *F24F 11/89* (2018.01); *F24F 11/88* (2018.01); *F24F 2140/50* (2018.01)

(58) Field of Classification Search
CPC ........ F24F 11/89; F24F 11/88; F24F 2140/50; F24F 13/20; F24F 2013/207
See application file for complete search history.

(56) References Cited

U.S. PATENT DOCUMENTS

| | | |
|---|---|---|
| 3,967,164 A | 6/1976 | Valle |
| 4,090,230 A | 5/1978 | Fuller et al. |
| 5,095,403 A | 3/1992 | Pin et al. |
| 6,366,448 B1 | 4/2002 | Berndt et al. |
| 8,047,013 B2 | 11/2011 | Ishikawa |
| 8,547,686 B2 | 10/2013 | Pruehs et al. |
| 8,785,771 B2 | 7/2014 | Dunkleberger et al. |

(Continued)

FOREIGN PATENT DOCUMENTS

| | | |
|---|---|---|
| CN | 202094497 U | 12/2011 |
| WO | 2013113524 A1 | 8/2013 |

(Continued)

OTHER PUBLICATIONS

US 10,777,978 B2, 09/2020, Rogers et al. (withdrawn)
Extended European Search Report; European Patent Application No. 21214998.3, dated Jun. 10, 2022 (9 pages).

*Primary Examiner* — Nelson J Nieves
(74) *Attorney, Agent, or Firm* — HSML P.C.

(57) ABSTRACT

A layered control panel for a heating, ventilation, air conditioning, and refrigeration (HVACR) unit includes an outer layer on which low-voltage components are placed, and an inner layer on which high-voltage components are placed. The outer layer is capable of taking a closed position where it blocks access to the inner layer, and an open position where the outer layer does not block access to the inner layer. The outer layer can include a lock to keep the outer layer in the closed position. The outer layer can be one or two or more panels mounted on hinges that allow the outer layer to swing between closed and open positions.

20 Claims, 4 Drawing Sheets

(56) References Cited

U.S. PATENT DOCUMENTS

| | | |
|---|---|---|
| 9,568,208 B2 | 2/2017 | West et al. |
| 9,819,158 B2 | 11/2017 | Tremaine et al. |
| 9,843,171 B2 | 12/2017 | Richards et al. |
| 9,922,785 B2 | 3/2018 | Jur et al. |
| 9,979,166 B2 | 5/2018 | Shimabukuro et al. |
| 10,373,780 B2 | 8/2019 | Jur et al. |
| 10,389,172 B2 | 8/2019 | Soroka |
| 10,535,983 B2 | 1/2020 | Boisnier |
| 10,537,034 B2 | 1/2020 | Uy et al. |
| 2003/0213853 A1 | 11/2003 | Demster |
| 2004/0017643 A1 | 1/2004 | Hartling et al. |
| 2009/0077988 A1 | 3/2009 | Ishikawa et al. |
| 2014/0117825 A1 | 5/2014 | Lee et al. |
| 2020/0124298 A1 | 4/2020 | Lee et al. |
| 2020/0203934 A1 | 6/2020 | Kozel et al. |
| 2020/0208868 A1 | 7/2020 | Jayarathne et al. |
| 2021/0018192 A1 | 1/2021 | Kitabatake et al. |
| 2021/0207894 A1 | 7/2021 | Kurokawa et al. |
| 2021/0239331 A1 | 8/2021 | Kadu et al. |
| 2022/0034524 A1 | 2/2022 | Mori |

FOREIGN PATENT DOCUMENTS

| | | |
|---|---|---|
| WO | 2013173958 A1 | 11/2013 |
| WO | 2020169471 A1 | 8/2020 |

LAYERED CONTROL PANEL DESIGN TO PROVIDE SEPARATION OF HIGH/LOW VOLTAGE

FIELD

This disclosure is directed to control panels for heating, ventilation, air conditioning, and refrigeration (HVACR) units, particularly control panels separating high and low-voltage controls.

BACKGROUND

Control panels for heating, ventilation, air conditioning, and refrigeration (HVACR) units typically include low-voltage components alongside high-voltage components. High-voltage components typically are very restrictive with respect to servicing, often requiring unit shutdown, servicers wearing protective equipment, and/or other significant steps to be safely serviced. Current control panels can provide high-voltage components in a region of the panel that can be protected by their own compartment having a separate door, but this is space-inefficient, particularly relative to the limited space in which control panels can be provided on some HVACR units.

SUMMARY

This disclosure is directed to control panels for heating, ventilation, air conditioning, and refrigeration (HVACR) units, particularly control panels separating high and low-voltage controls.

Layered control panels according to embodiments can effectively separate low-voltage components from high-voltage components, while taking advantage of the layering to be space-efficient. Low-voltage components can be provided on an outer layer so that they can be accessed readily, while high-voltage components are provided on an inner layer which is typically covered by the outer layer, restricting access to the high-voltage components. The layered design allows the same surface area to be used for each set of components, while the order of the layering facilitates servicing of low-voltage components while restricting access to high-voltage components. Further, this arrangement allows the HVACR unit to continue to be operated during servicing of the low-voltage components, facilitating diagnosis of some potential issues and streamlining troubleshooting processes.

In an embodiment, a control panel for a heating, ventilation, air conditioning, and refrigeration (HVACR) unit includes a control panel housing having an open side, an inner layer disposed within the control panel housing, a plurality of high-voltage components disposed on the inner layer, an outer layer disposed closer to the open side of the control panel housing, and a plurality of low-voltage components disposed on the outer layer. The outer layer is configured to be movable between a closed position where the outer layer covers the plurality of high-voltage components with respect to the open side of the control panel housing and an open position where the plurality of high-voltage components are accessible through the open side of the control panel housing. The high-voltage components are disposed only on the inner layer.

In an embodiment, the low-voltage components are safety extra-low voltage (SELV) components.

In an embodiment, the outer layer comprises a single piece. In an embodiment, the control panel further includes a hinge on a first side of the single piece of the outer layer, the hinge connecting the single piece of the outer layer to the control panel housing. In an embodiment, the control panel further includes a lock on a second side of the single piece of the outer layer, the second side opposite the first side.

In an embodiment, the outer layer comprises a plurality of pieces. In an embodiment, each of the plurality of pieces includes a hinge, the hinge connecting the piece to the control panel housing. In an embodiment, at least two of the plurality of pieces are configured to be locked to a housing support when the outer layer is in the closed position. In an embodiment, some of the plurality of low-voltage components are disposed on each of the plurality of pieces. In an embodiment, the low-voltage components are disposed on only one of the plurality of pieces.

In an embodiment, a heating, ventilation, air conditioning, and refrigeration (HVACR) unit includes a control panel disposed on an exterior surface of the HVACR unit. The control panel includes a control panel housing having an open side, an inner layer disposed within the control panel housing, a plurality of high-voltage components disposed on the inner layer, an outer layer disposed closer to the open side of the control panel housing, and a plurality of low-voltage components disposed on the outer layer. The outer layer is configured to be movable between a closed position where the outer layer covers the plurality of high-voltage components with respect to the open side of the control panel housing and an open position where the plurality of high-voltage components are accessible through the open side of the control panel housing. The high-voltage components are disposed only on the inner layer.

In an embodiment, the low-voltage components are safety extra-low voltage (SELV) components.

In an embodiment, the outer layer comprises a single piece. In an embodiment, the control panel further includes a hinge on a first side of the single piece of the outer layer, the hinge connecting the single piece of the outer layer to the control panel housing. In an embodiment, the control panel further includes a lock on a second side of the single piece of the outer layer, the second side opposite the first side.

In an embodiment, the outer layer comprises a plurality of pieces. In an embodiment, each of the plurality of pieces includes a hinge, the hinge connecting the piece to the control panel housing. In an embodiment, at least two of the plurality of pieces are configured to be locked to a housing support when the outer layer is in the closed position. In an embodiment, some of the plurality of low-voltage components are disposed on each of the plurality of pieces. In an embodiment, the low-voltage components are disposed on only one of the plurality of pieces.

DRAWINGS

DETAILED DESCRIPTION

This disclosure is directed to control panels for heating, ventilation, air conditioning, and refrigeration (HVACR) units, particularly control panels separating high and low-voltage controls.

Figure 1:
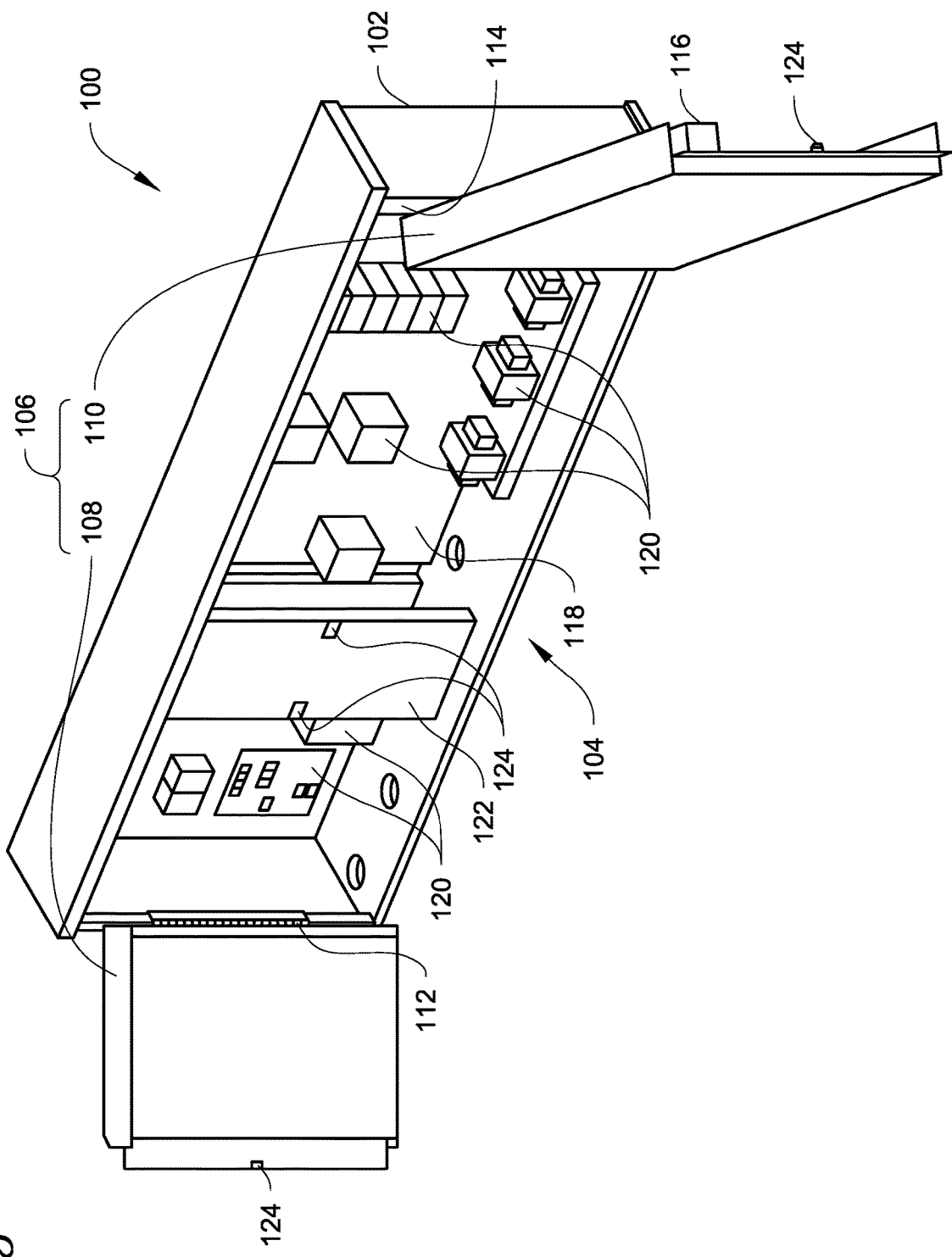
FIG. 1 shows a perspective view of a control panel according to an embodiment, where the doors carrying low-voltage components are open.

FIG. 1 shows a perspective view of a control panel according to an embodiment, where the layer carrying low-voltage components is open. Control panel 100 includes control panel housing 102 having an open side 104, an outer layer 106 including first outer layer portion 108, and second outer layer portion 110, a first hinge 112, a second hinge 114, low-voltage components 116, inner layer 118, and high-voltage components 120. Housing support 122 is provided in the control panel housing 102, between the inner layer 118 and the open side 104, when the inner layer 118 is in a closed position.

Control panel housing 102 is a housing configured to contain one or more components such as controls, including low-voltage components 116 and high-voltage components 120. Control panel housing 102 can protect its contents from an exterior environment and/or from unauthorized access. Control panel housing 102 can include one or more walls defining a perimeter of a shape and providing an open side 104. The control panel housing 102 can be mounted on an HVACR unit, for example being provided on a wall of a cabinet of an HVACR unit such as a side wall of the cabinet.

Open side 104 is defined by the control panel housing 102. Open side 104 of the control panel housing 102 can be sized and positioned in order to access to at least some of the contents of control panel housing 102. The open side 104 can be sized and positioned to allow at least the portion of the contents of control panel housing 102 to be accessed for servicing, for example being sized to allow hands and tools of maintenance personnel to reach into the control panel housing 102.

Outer layer 106 includes one or more panels. Outer layer 106 is configured to be movable between a closed position and an open position. In an embodiment, outer layer 106 is movable between the closed position and the open position by moving each of the one or more panels forming outer layer 106. The one or more panels of the outer layer can each be rotatable about hinges to move between the closed and open positions. When outer layer 106 is in a closed position, outer layer 106 is in a space between the open side 104 and the inner layer 118, such that the outer layer 106 can be accessed through the open side 104, but outer layer 106 is positioned such that it obstructs access to inner layer 118. Outer layer 106 can have one or more low-voltage components 116 located on its surfaces. In an embodiment, low-voltage components 116 are located only on the outer layer 106 and are not, for example, included on inner layer 118. In an embodiment, the low-voltage components 116 are provided on the outer layer 106 such that they can be accessed for operation or maintenance when the outer layer 106 is in the closed position. In an embodiment, the outer layer 106 is a continuous layer when in the closed position, including either one portion or multiple portions that connect to one another. In an embodiment, the outer layer 106 includes one or more portions, where at least some of the portions of outer layer 106 connect to the housing support 122 when outer layer 106 is in the closed position. In the embodiment shown in FIG. 1, outer layer 106 includes first outer layer portion 108 and second outer layer portion 110.

First outer layer portion 108 is one of the panels that forms a part of outer layer 106. First outer layer portion 108 can be joined to the control panel housing 102 by way of first hinge 112. First outer layer portion 108 can be any suitable material for a panel supporting low-voltage components 116. First outer layer portion 108 can include at least some of the low-voltage components 116 included in control panel 100. In an embodiment, first outer layer portion 108 includes one or more retention features 124 such that it can be secured to another part, such as second outer layer portion 110 or housing support 122. In an embodiment, the first outer layer portion 108 can be secured to the housing support 122 when the first outer layer portion 108 is in the closed position for outer layer 106.

Second outer layer portion 110 is another panel forming a part of outer layer 106. Second outer layer portion 110 can be joined to the control panel housing 102 by way of second hinge 114. Second outer layer portion 110 can be any suitable material for a panel supporting low-voltage components 116. Second outer layer portion 110 can include at least some of the low-voltage components 116 included in control panel 100. In an embodiment, second outer layer portion 110 includes one or more retention features 124 such that it can be secured to another part, such as first outer layer portion 108 or housing support 122. In an embodiment, the second outer layer portion 110 can be secured to the housing support 122 when the second outer layer portion 110 is in the closed position for outer layer 106.

Low-voltage components 116 are electronic components such as controls for the HVACR system. Low-voltage components 116 can be electronic components that can be safe to access, operate, or service without risk to personnel. In an embodiment, the low-voltage components 116 can be safe to access, operate, or service without requiring personnel to be equipped with personal protective equipment. Low-voltage components 116 can include, for example, any suitable separated or safety extra-low-voltage (SELV) components for the HVACR system including control panel 100. The classification of low-voltage components 116 as SELV components can be performed according to any suitable standards for such status, such as defined installation standards. An example of such a standard is UL60335-1. In an embodiment, all of the low-voltage components 116 included in control panel 100 can be provided only on the outer layer 106 such that the low-voltage components 116 can be operated or serviced while the outer layer is in the closed position. Low-voltage components 116 can be provided on any one or more portions of the outer layer 106. In an embodiment, low-voltage components 116 are provided on each of the portions making up outer layer 106. Non-limiting examples of low-voltage components include programmable logic controllers, communication modules, controller-to-harness interface circuits, extra low voltage distribution terminal blocks, and the like.

Inner layer 118 is a panel or support configured to support high-voltage components 120. In an embodiment, inner layer 118 can be positioned within control panel housing 102 such that it is further from the open side 104 than the outer layer 106 at least when the outer layer 106 is in the closed position. Inner layer 118 can be positioned further from the open side 104 than an outermost portion of housing support 122 when a housing support 122 is included in control panel 100. The inner layer 118 can be any suitable material for a panel supporting high-voltage components 120. In an embodiment, all high-voltage components 120 included in control panel 100 are located on inner layer 118. In an embodiment, no low-voltage components 116 are located on inner layer 118.

In an embodiment, inner layer 118 can be opposite sides of some or all of the panels defining outer layer 106, such as first outer layer portion 108 and second outer layer portion 110. In this embodiment, inner layer 118 is provided inside the control panel housing 102 when the first outer layer 106 is in the closed position.

High-voltage components 120 are provided on inner layer 118. The high-voltage components are electrical and electronic components such as controls of the HVACR system included in control panel 100. The high-voltage components can be components that can pose risk to personnel accessing, operating, or servicing those components if energized during servicing. In an embodiment, the high-voltage components 120 can be the components that require lockout and/or tag-out procedures to be followed during servicing. The high-voltage components 120 can be components receiving power at voltages in excess of safe standards, such as components that do not comply with SELV standards. As described above, components can be identified as SELV using a suitable standard, such as standard UL60335-1. The high-voltage components 120 can be components requiring personal protective equipment to be worn when accessing, operating, or servicing those components. The high-voltage components 120 can be positioned on inner layer 118 such that they cannot be accessed through open side 104 when the outer layer 106 is in the closed position. The high-voltage components 120 can be positioned on inner layer 118 such that they can be accessed, operated, and/or serviced when outer layer 106 is not in the closed position, for example by being accessible through open side 104 when the outer layer 106 is in the open position. Non-limiting examples of high-voltage components include power distribution blocks, fuse blocks, contactors, circuit breakers, transformers, overload relays, and the like.

Housing support 122 can optionally be included within control panel housing 102. Housing support 122 can be a structural feature such as a column, a horizontal bar, divider, or other suitable feature provided within control panel housing 102. Housing support 122 can be configured to be contacted by portions of outer layer 106 when outer layer 106 is in the closed position. Housing support 122 can contribute to outer layer 106 obstructing access to high-voltage components 120 when the outer layer 106 is in the closed position.

Retention features 124 can be provided on outer layer 106 and/or the control panel housing 102 or optional housing support 122. The retention features 124 are configured to allow outer layer 106 to be retained in the closed position. The retention features 124 can be any suitable structures for retaining the outer layer 106 such as flanges, slots, tabs, latches, snap-fit features, hooks, or any corresponding features. In an embodiment, retention features 124 can be provided, for example, on first outer layer portion 108, second outer layer 110, and housing support 122. In this embodiment, the retention features 124 can be positioned and/or configured such that first outer layer portion 108 can be retained to housing support 122 at one position and second outer layer portion 110 can be retained to housing support 122 in another position. In another embodiment, retention features 124 can be configured to retain first outer layer portion 108 to second outer layer portion 110. In another embodiment, retention features 124 can be configured to secure a single piece outer layer 106 to control panel housing 102. In this embodiment, retention features 124 can be configured to secure the single piece outer layer 106 to the control panel housing 102 at an end of outer layer 106 opposite where a hinge connects the outer layer 106 to control panel 102. In an embodiment, the retention features can include a hand- or tool-turnable screw and a threaded hole configured to accommodate the screw. In an embodiment, the opposing retention feature 124 contacted by the screw can be a detent formed in a surface of the control panel housing 102 or outer layer portion 108, 110, depending on where the screw is to be used for retention.

Figure 2A:
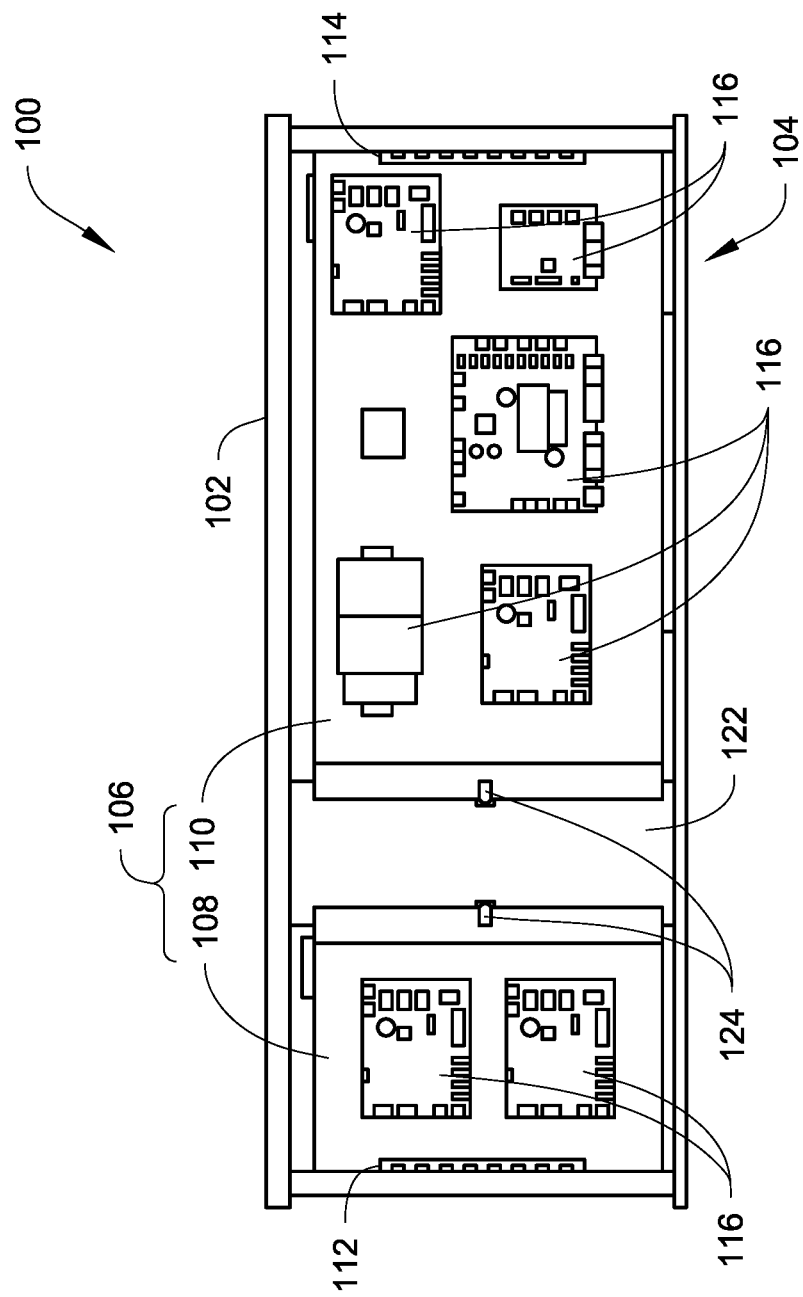
FIG. 2A shows a front view of the control panel shown in FIG. 1, when the outer layer carrying low-voltage components is closed.

FIG. 2A shows a front view of the control panel 100 shown in FIG. 1, when the outer layer carrying low-voltage components is closed. As can be seen in the view shown in FIG. 2A, each of first outer layer portion 108 and second outer layer portion 110 are rotated about first and second hinges 112, 114 such that they extend inwards from control panel housing 102 towards housing support 112. Each of first outer layer portion 108 and second outer layer portion 110 are locked to housing support 122 by their respective retention features 124. Thus, the low-voltage components 116 are accessible through the open side 104 of control panel housing 102, while outer layer 106 is positioned between the open side 104 of control panel housing 102 and the inner layer 118. The high-voltage components 120 are inaccessible from open side 104 when the outer layer 106 is in the closed position shown in FIG. 2A.

Figure 2B:
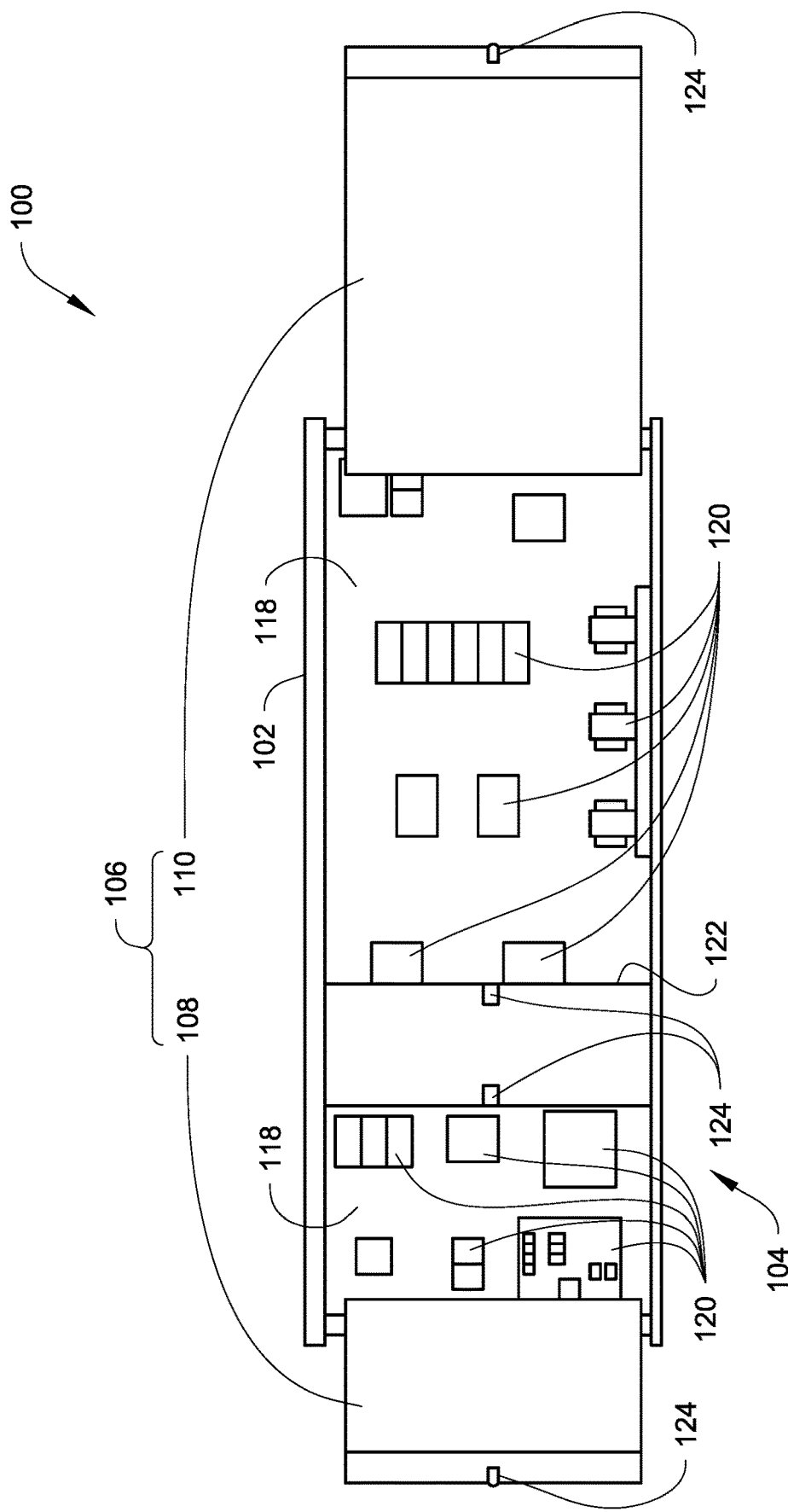
FIG. 2B shows a front view of the control panel shown in FIG. 1, when the outer layer carrying low-voltage components is open.

The closed position shown in FIG. 2A can be a standard position for the outer layer 106 during normal operations and servicing of the control panel 100. Since only low-voltage components 116 are accessible in the closed position shown in FIG. 2A, those components can be serviced or otherwise manipulated without requiring shutdown of the HVACR unit including control panel 100 or personnel donning electrical personal protective equipment. The retention features 124 retain the outer layer 106 in the position where it obstructs access to the high-voltage components 120. When retention features 124 are disengaged, the first portion 108 and second portion 110 of outer layer 106 can each be moved to place the control panel 100 into the open position shown in FIG. 2B FIG. 2B shows a front view of the control panel 100 shown in FIG. 1, when the outer layer 106 carrying low-voltage components is open. The open position shown in FIG. 2B can be achieved by releasing any retention features 124 and moving outer layer 106, for example by rotating first portion 108 about first hinge 112 and rotating second portion 110 about second hinge 114. In the open position, the inner layer 118 and the high-voltage components 120 can be accessed through the open side 104 of control panel housing 102. In an embodiment the housing support 122 can still be located between a portion of open side 104 and the inner layer 118. In an embodiment, the high-voltage components 120 can be disposed on inner layer 118 such that access to the high-voltage components 120 is not obstructed by housing support 122. In an embodiment, the open position of FIG. 2B can be taken following lockout and/or tag-out procedures for the servicing of high-voltage components 120.

Figure 3:
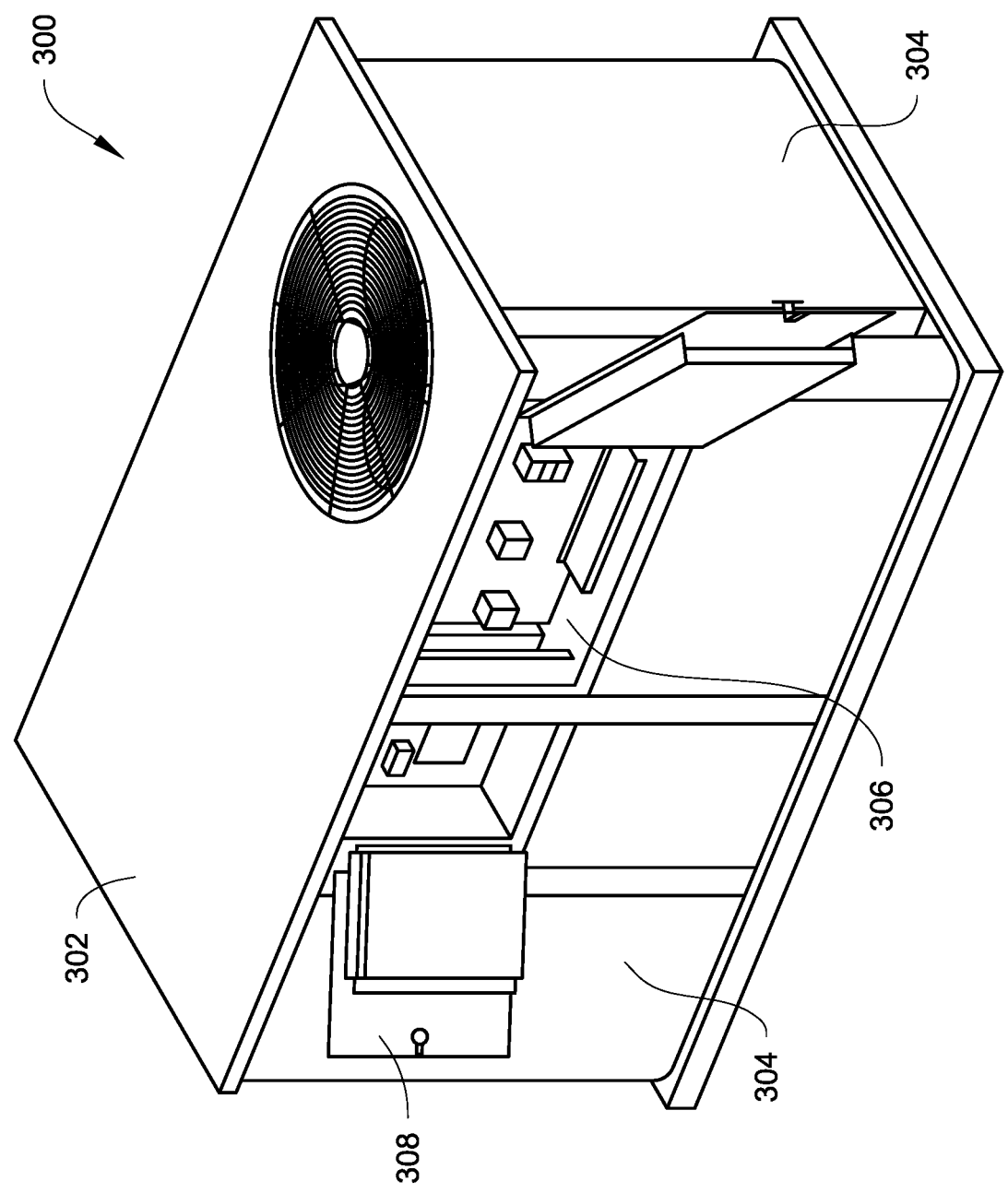
FIG. 3 shows a heating, ventilation, air conditioning, and refrigeration system including a control panel according to an embodiment.

FIG. 3 shows a heating, ventilation, air conditioning, and refrigeration (HVACR) system including a control panel according to an embodiment. HVACR system 300 includes cabinet 302 having side walls 304, and a control panel 306 provided on a surface of one of the side walls 304. Cabinet 302 is a structure containing at least some components of the HVACR system 300, such as, as non-limiting examples, air handling blowers, outdoor coils, compressors, or any other suitable HVACR system component. Side walls 304 define the exterior of the cabinet 302. The control panel 306 is provided on one of the side walls 304. Control panel 306 contains one or more electronic components used to control and/or operate HVACR system 300. The control panel 306 can be the control panel of FIG. 1 or 2A and 2B as described above. In an embodiment, control panel 306 is mounted recessed into the side wall 304 such that when it is in the closed position, the outer layer is recessed or flush with respect to side wall 304. In an embodiment, control panel 306 projects outwards from side wall 304. Control panel 306 can further include one or more doors 308. The doors 308 can cover an open side of a control panel housing of the control panel 306. When closed, doors 308 can obstruct access to an outer layer including low-voltage components of control panel 306, such as outer layer 106 of control panel 100 as described above and shown in FIG. 1. In an embodiment, doors 308 form part of one of side walls 304. In an embodiment, doors 308 can be flush with side wall 304 that control panel 306 is mounted in.

Aspects:

It is understood that any of aspects 1-10 can be combined with any of aspects 11-20.

Aspect 1. A control panel for a heating, ventilation, air conditioning, and refrigeration (HVACR) unit, comprising:
 a control panel housing having an open side;
 an inner layer disposed within the control panel housing;
 a plurality of high-voltage components disposed on the inner layer;
 an outer layer disposed closer to the open side of the control panel housing;
 a plurality of low-voltage components disposed on the outer layer;
 wherein
 the outer layer is configured to be movable between:
 a closed position where the outer layer covers the plurality of high-voltage components with respect to the open side of the control panel housing, and
 an open position where the plurality of high-voltage components are accessible through the open side of the control panel housing, and
 the high-voltage components are disposed only on the inner layer.

Aspect 2. The control panel according to aspect 1, wherein the low-voltage components are safety extra-low voltage (SELV) components.

Aspect 3. The control panel according to any of aspects 1-2, wherein the outer layer comprises a single piece.

Aspect 4. The control panel according to aspect 3, further comprising a hinge on a first side of the single piece of the outer layer, the hinge connecting the single piece of the outer layer to the control panel housing.

Aspect 5. The control panel according to aspect 4, further comprising a lock on a second side of the single piece of the outer layer, the second side opposite the first side.

Aspect 6. The control panel according to any of aspects 1-2 wherein the outer layer comprises a plurality of pieces.

Aspect 7. The control panel according to aspect 6, wherein each of the plurality of pieces includes a hinge, the hinge connecting the piece to the control panel housing.

Aspect 8. The control panel according to any of aspects 6-7, wherein at least two of the plurality of pieces are configured to be locked to a housing support when the outer layer is in the closed position.

Aspect 9. The control panel according to any of aspects 6-8, wherein some of the plurality of low-voltage components are disposed on each of the plurality of pieces.

Aspect 10. The control panel according to any of aspects 6-8, wherein the low-voltage components are disposed on only one of the plurality of pieces.

Aspect 11. A heating, ventilation, air conditioning, and refrigeration (HVACR) unit, comprising a control panel disposed on an exterior surface of the HVACR unit, the control panel comprising:
 a control panel housing having an open side;
 an inner layer disposed within the control panel housing;
 a plurality of high-voltage components disposed on the inner layer;
 an outer layer disposed closer to the open side of the control panel housing;
 a plurality of low-voltage components disposed on the outer layer;
 wherein:
 the outer layer is configured to be movable between:
 a closed position where the outer layer covers the plurality of high-voltage components with respect to the open side of the control panel housing, and
 an open position where the plurality of high-voltage components are accessible through the open side of the control panel housing, and
 the high-voltage components are disposed only on the inner layer.

Aspect 12. The HVACR unit according to aspect 11, wherein the low-voltage components are safety extra-low voltage (SELV) components.

Aspect 13. The HVACR unit according to any of aspects 11-12, wherein the outer layer comprises a single piece.

Aspect 14. The HVACR unit according to aspect 13, further comprising a hinge on a first side of the single piece of the outer layer, the hinge connecting the single piece of the outer layer to the control panel housing.

Aspect 15. The HVACR unit according to aspect 14, further comprising a lock on a second side of the single piece of the outer layer, the second side opposite the first side.

Aspect 16. The HVACR unit of according to any of aspects 11-12, wherein the outer layer comprises a plurality of pieces.

Aspect 17. The HVACR unit according to aspect 16, wherein each of the plurality of pieces includes a hinge, the hinge connecting the piece to the control panel housing.

Aspect 18. The HVACR unit according to any of aspects 16-17, wherein at least two of the plurality of pieces are configured to be locked to a housing support when the outer layer is in the closed position.

Aspect 19. The HVACR unit according to any of aspects 16-18, wherein some of the plurality of low-voltage components are disposed on each of the plurality of pieces.

Aspect 20. The HVACR unit according to any of aspects 16-18, wherein the low-voltage components are disposed on only one of the plurality of pieces.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A control panel for a heating, ventilation, air conditioning, and refrigeration (HVACR) unit, comprising:
 a control panel housing having an open side;
 an inner layer disposed within the control panel housing;
 a plurality of high-voltage components disposed on the inner layer wherein all of the plurality of high-voltage components are disposed only on the inner layer, and
 an outer layer disposed closer to the open side of the control panel housing;

a plurality of low-voltage components disposed on the outer layer;

wherein:

the outer layer is configured to be movable between:

an open position and a closed position, where, in the closed position, the outer layer covers the plurality of high-voltage components with respect to the open side of the control panel housing, and all of the plurality of high-voltage components are inaccessible from the open side when the outer layer is in the closed position.

2. The control panel of claim 1, wherein the low-voltage components are safety extra-low voltage (SELV) components.

3. The control panel of claim 1, wherein the outer layer comprises a single piece.

4. The control panel of claim 3, further comprising a hinge on a first side of the single piece of the outer layer, the hinge connecting the single piece of the outer layer to the control panel housing.

5. The control panel of claim 4, further comprising a lock on a second side of the single piece of the outer layer, the second side opposite the first side.

6. The control panel of claim 1, wherein the outer layer comprises a plurality of pieces.

7. The control panel of claim 6, wherein each piece of the plurality of pieces includes a hinge, the hinge connecting the piece to the control panel housing.

8. The control panel of claim 6, wherein at least two of the plurality of pieces are configured to be locked to a housing support when the outer layer is in the closed position.

9. The control panel of claim 6, wherein some of the plurality of low-voltage components are disposed on each of the plurality of pieces.

10. The control panel of claim 6, wherein the low-voltage components are disposed on only one of the plurality of pieces.

11. A heating, ventilation, air conditioning, and refrigeration (HVACR) unit, comprising a control panel disposed on an exterior surface of the HVACR unit, the control panel comprising:

a control panel housing having an open side;

an inner layer disposed within the control panel housing;

a plurality of high-voltage components disposed on the inner layer, wherein all of the plurality of high-voltage components are disposed only on the inner layer;

an outer layer disposed closer to the open side of the control panel housing;

a plurality of low-voltage components disposed on the outer layer;

wherein:

the outer layer is configured to be movable between:

a closed position where the outer layer covers the plurality of high-voltage components with respect to the open side of the control panel housing, and an open position where the plurality of high-voltage components are accessible through the open side of the control panel housing, and all of the plurality of high-voltage components are inaccessible from the open side when the outer layer is in the closed position.

12. The HVACR unit of claim 11, wherein the low-voltage components are safety extra-low voltage (SELV) components.

13. The HVACR unit of claim 11, wherein the outer layer comprises a single piece.

14. The HVACR unit of claim 13, further comprising a hinge on a first side of the single piece of the outer layer, the hinge connecting the single piece of the outer layer to the control panel housing.

15. The HVACR unit of claim 14, further comprising a lock on a second side of the single piece of the outer layer, the second side opposite the first side.

16. The HVACR unit of claim 11, wherein the outer layer comprises a plurality of pieces.

17. The HVACR unit of claim 16, wherein each piece of the plurality of pieces includes a hinge, the hinge connecting the piece to the control panel housing.

18. The HVACR unit of claim 16, wherein at least two of the plurality of pieces are configured to be locked to a housing support when the outer layer is in the closed position.

19. The HVACR unit of claim 16, wherein some of the plurality of low-voltage components are disposed on each of the plurality of pieces.

20. The HVACR unit of claim 16, wherein the low-voltage components are disposed on only one of the plurality of pieces.

* * * * *